May 22, 1962

J. D. FORNEY 3,036,170

WALL INLET FOR VACUUM SYSTEM

Filed July 16, 1959

INVENTOR.
JACK D. FORNEY
BY *Victor J. Evans & Co.*

ATTORNEYS

United States Patent Office 3,036,170
Patented May 22, 1962

3,036,170
WALL INLET FOR VACUUM SYSTEM
Jack D. Forney, P.O. Box 563, Fort Collins, Colo.
Filed July 16, 1959, Ser. No. 827,653
2 Claims. (Cl. 200—61.6)

This invention relates to a vacuum system, and more particularly to a wall inlet for a remote installed vacuum system.

The object of the invention is to provide a wall inlet which is constructed so that a vacuum hose can be readily connected to a remote source of vacuum pressure, and wherein when the vacuum hose or conduit is disconnected from the inlet, the source of vacuum pressure will be automatically interrupted, and wherein with the vacuum hose or conduit inserted in the inlet, the electrical circuit to the vacuum creating means will be automatically completed.

Another object of the invention is to provide a wall inlet for a remote installed vacuum system of the central vacuum system types, wherein a vacuum creating mechanism is adapted to be permanently installed in a garage, basement, or other remote location of a home or other locality, and wherein vacuum pipes or conduits run or extend to various rooms or points of use, and wherein according to the present invention whenever it is desired to use the vacuum in a particular room or area, a conduit or hose can be readily connected to the inlet so as to automatically actuate the vacuum creating means.

A further object of the invention is to provide a wall inlet for a remote installed vacuum system which is extremely simple and inexpensive to manufacture.

Other objects and advantages will be apparent during the course of the following description.

In the accompanying drawings, forming a part of this application, and in which like numerals are used to designate like parts throughout the same:

Figure 1:
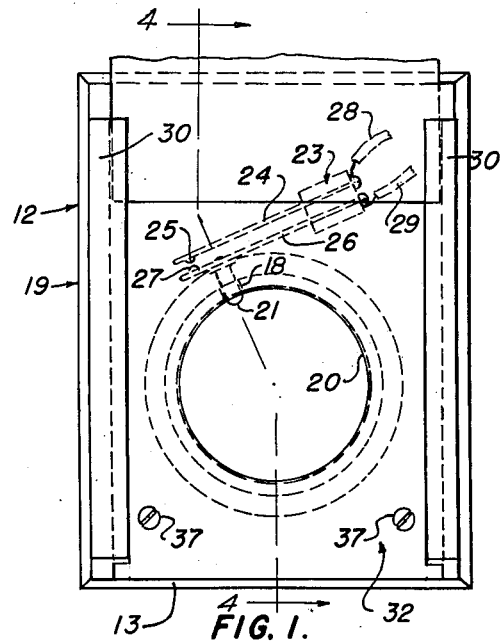
FIGURE 1 is an elevational view illustrating the wall inlet for remote installed vacuum system, and with the closures in closed or lowered positions.

Referring in detail to the drawings, the numeral 10 indicates a supporting structure such as a wall, and the numeral 19 indicates the wall inlet of the present invention. The wall 10 which may be arranged in a home, office or the like or any other locality or area, is provided with a circular opening 11. The numeral 12 indicates a stationary body member which includes a plate portion 13 as well as a cylindrical collar 14, and the collar 14 extends through the opening 11 in the wall 10. The plate portion 13 is provided with a circular opening 20 which registers with the bore or opening of the collar 14. The outer periphery of the collar 14 is provided with an annular groove 15, and the numeral 16 indicates an O-ring which is adapted to be made of a suitable yieldable or resilient material, and the numeral 17 indicates a conduit which surrounds a portion of the collar 14 and frictionally engages the ring 16, the ring 16 serving to insure that there will be an efficient seal between the conduit 17 and collar 14 so that loss of vacuum pressure will be prevented. The conduit 17 is adapted to be connected to a remote vacuum source such as a vacuum creating machine which may be located in a basement, garage, or other remote point.

As shown in the drawings, the collar 14 is provided with an aperture 18. The numeral 21 indicates a movable pin which is slidably mounted in the aperture 18, and the inner end of the pin 21 is adapted to be selectively engaged by the vacuum hose or tubular member 22, when the member 22 is inserted through the opening 20 and into the collar 14. The numeral 23 indicates a microswitch which includes a stationary arm 24 that has a contact 25 thereon, and there is also provided a movable arm 26 which carries the contact 27 that is mounted for movement into and out of engagement with the stationary contact 25, the movable arm 26 being affixed to or connected to the pin 21. Wires or conductors 28 and 29 are connected to the microswitch 23, and these wires are adapted to be connected to the vacuum creating mechanism which is located in the remote location, so that when the member 22 is inserted in the position in FIGURE 4, the contacts 27 and 25 are in engagement with each other so as to complete the electrical circuit through the wires 28 and 29 in order to automatically actuate the vacuum creating machine. Furthermore, when the member 22 is removed, the arm 26 will automatically move away from the arm 24 since the pin 21 is free to travel inwardly through the aperture 18 and this will separate the contacts 25 and 27 so as to interrupt the electrical circuit leading to the vacuum creating machine so that no vacuum will be created when the member 22 is not inserted in the collar 14.

Figure 3:
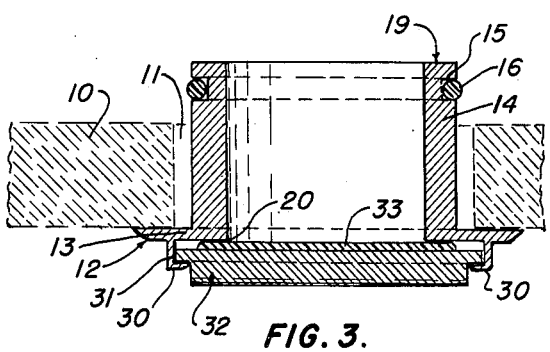
FIGURE 3 is a transverse sectional view and showing the closure in closed position.

Secured to the plate member 13 or formed integral therewith is a pair of spaced parallel opposed grooved flanges 30 which define a trackway 31 therebetween, FIGURE 3. The numeral 32 indicates a movable closure which is slidably mounted in the trackway 31, and the closure 32 has affixed thereto a resilient rectangular pad 33, and the pad 33 is mounted for movement into and out of open or closed relation wtih respect to the opening 20. The upper end of the movable closure 32 is provided with a finger engaging lip or tab 34. There is also arranged on the upper end of the closure a shoulder 35 which defines a stop member which is adapted to selectively engage a portion 36 of the plate 13 so as to limit downward sliding movement of the closure.

The plate 13 is adapted to be affixed to the wall or supporting member 10 as for example by means of securing elements or screws 37 which can extend through suitable apertures or openings in the plate.

Figure 2:
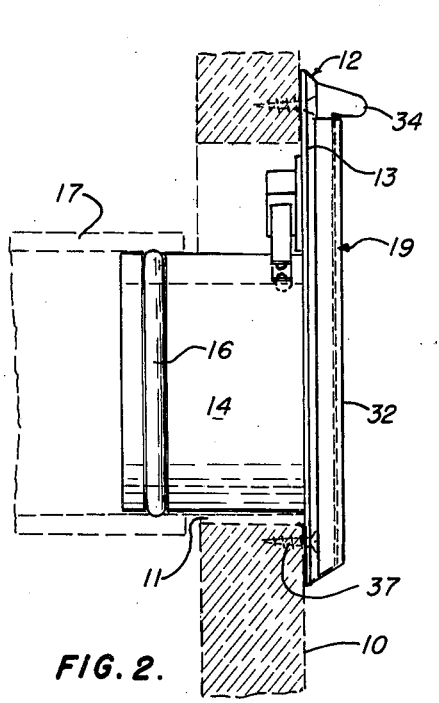
FIGURE 2 is a sectional view taken at right angle to the view shown in FIGURE 1.

From the foregoing, it is apparent that there has been provided a wall inlet for a remote installed vacuum system, and in use the vacuum producing mechanism is adapted to be arranged in a remote location in a building, and the conduit 17 serves to connect the vacuum producing mechanism to the inlet 19 of the present invention. The conduit 17 frictionally engages the yieldable ring 16 so as to provide an airtight connection between the collar and the conduit. When the vacuum inlet is not being used, the closure 32 is in the lower position as shown in FIGURES 1, 2, and 3 and the spring 21 is urged to its innermost position with respect to the aperture 18 due to the inherent characteristics of the arm 26. With the pin 21 in its innermost position, the contacts 27 and 25 are separated so that the electrical circuit to the wires 28 and 29 to the vacuum producing mechanism motor is interrupted so that no vacuum will be produced when it is not needed.

Figure 4:
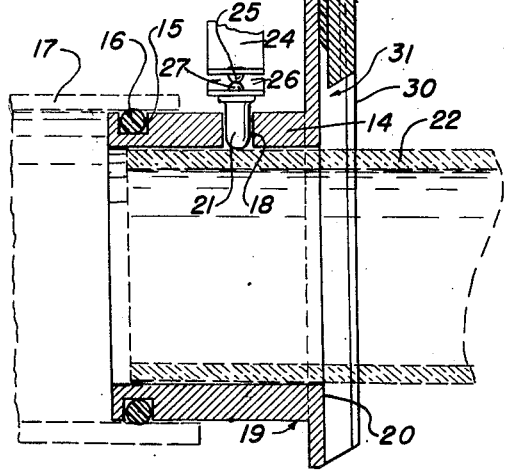
FIGURE 4 is a vertical sectional view, showing the closure in raised or open position.

When it is desired to use a vacuum cleaner in a room or the like, the tubular member or hose 22 which leads to the vacuum cleaner nozzle, is arranged in the position in FIGURE 4, it being understood that the enclosure 32 is first moved to the raised position as shown therein. The tab 34 permits the closure 32 to be readily manually raised, and the flanges 30 define a trackway so that the closure 32 can readily slide up or down. When the tubular member 22 is inserted through the opening 20 and into the collar 14, the pin 21 will be urged outwardly by the member 22 and this causes the contact 27 to engage the contact 25 so as to complete the electrical circuit to the vacuum producing mechanism whereby the vacuum pressure will be able to pass through the conduit 17, through the member 22 and then into the nozzle, or other member which is being used.

When the member 22 is removed from the collar 14, as for example when it is not needed, the closure 32 can move downwardly by gravity and the resilient pad 33 will close off the opening 20 so that an effective seal is provided.

The parts can be made of any suitable material and in different shapes or sizes.

Thus, it will be seen that according to the present invention there has been provided a wall inlet for a remote installed vacuum system which is sometimes referred to as a central vacuum system, as for example where the vacuum cleaner is permanently installed in the garage, basement, or the like of a home or other building and wherein the vacuum pipes run or extend to various rooms or points of use.

The flexible vacuum hose 22 is adapted to be connected to a cleaning attachment and then plugged into the wall inlet and the wall inlet has a low voltage switch which is automatically operated to control a relay in the vacuum cleaner which turns the vacuum cleaner motor off and on.

Some of the important aspects of the present invention are as follows. The switch is actuated by the manual insertion of the vacuum hose 22 into the inlet and this automatically turns the remote vacuum cleaner on and the removal of the hose automatically turns the vacuum cleaner off. There is provided a sliding door or closure 32 which has a large flat tab 33 of rubber and since this is supported by metal, it gives a considerably greater contact to prevent vacuum leaks than have been possible previously. Furthermore, the provision of the sliding door is advantageous and the use of the O-ring 16 serves to provide a vacuum seal so that it is not necessary to use an adhesive or glue or mastic to make the proper connection.

Minor changes in shape, size and rearrangement of details coming within the field of invention claimed may be resorted to in actual practice, if desired.

I claim:

1. In a device of the character described, a body member including a flat plate portion provided with a circular opening, a cylindrical collar extending from said plate portion and registering with said opening, there being an aperture in said collar, a pin slidably mounted in said aperture, a switch including a stationary arm provided with a contact, a movable arm connected to said pin and having a contact mounted for movement into and out of engagement with the contact on said stationary arm, said body member being provided with opposed flanges which define a trackway, a closure slidably mounted in said trackway, a rectangular resilient pad connected to said closure and mounted for movement into and out of closing and opening relation with respect to the opening in said plate portion, there being an annular groove in the outer periphery of said collar, and yieldable O-rings seated in said groove, a conduit surrounding said collar and engaging said O-ring, said conduit adapted to be connected to a source of vacuum pressure.

2. The structure as defined in claim 1 and further including a finger engaging lip on the upper end of said closure.

References Cited in the file of this patent
UNITED STATES PATENTS

| | | |
|---|---|---|
| 2,596,210 | Cogshall | May 13, 1952 |
| 2,877,313 | Stoicos | Mar. 10, 1959 |
| 2,953,806 | Walker | Sept. 27, 1960 |